United States Patent
Nykerk

(10) Patent No.: US 8,922,388 B2
(45) Date of Patent: Dec. 30, 2014

(54) VEHICLE PUDDLE LAMP RESPONSIVE TO GROUND SURFACE CONDITIONS

(71) Applicant: Federal-Mogul Corporation, Southfield, MI (US)

(72) Inventor: Todd Nykerk, Holland, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 13/761,815

(22) Filed: Feb. 7, 2013

(65) Prior Publication Data

US 2014/0218212 A1  Aug. 7, 2014

(51) Int. Cl.
  *G08G 1/00* (2006.01)
  *B60Q 1/00* (2006.01)

(52) U.S. Cl.
  CPC .................................. *B60Q 1/0023* (2013.01)
  USPC ........... 340/901; 340/472; 340/905; 340/468; 362/494

(58) Field of Classification Search
  CPC ........ G08B 19/02; G08B 1/50; G08B 1/2665; G08B 1/32; G08B 1/323; G08B 1/2669
  USPC ...................... 340/901, 472, 425.5, 905, 468; 362/494, 464
  See application file for complete search history.

(56) References Cited

U.S. PATENT DOCUMENTS

| | | | |
|---|---|---|---|
| 4,779,095 A * | 10/1988 | Guerreri | 340/904 |
| 5,239,452 A | 8/1993 | Chen | |
| 5,710,554 A * | 1/1998 | Pettler et al. | 340/905 |
| 6,254,259 B1 | 7/2001 | Kobayashi | |
| 6,441,943 B1 | 8/2002 | Roberts et al. | |
| 6,502,970 B1 | 1/2003 | Anderson et al. | |
| 6,536,928 B1 | 3/2003 | Hein et al. | |
| 6,877,887 B2 | 4/2005 | Lin | |
| 7,192,172 B1 | 3/2007 | Alberti | |
| 7,342,707 B2 | 3/2008 | Roberts et al. | |
| 7,404,655 B2 | 7/2008 | Walser et al. | |
| 2002/0075141 A1 * | 6/2002 | Lang et al. | 340/438 |
| 2003/0137851 A1 | 7/2003 | Pan | |
| 2007/0053195 A1 * | 3/2007 | Alberti | 362/494 |
| 2007/0274087 A1 | 11/2007 | Herold | |
| 2008/0068857 A1 | 3/2008 | Meinke et al. | |
| 2010/0321945 A1 | 12/2010 | Lang et al. | |
| 2011/0001428 A1 | 1/2011 | Rodriquez Barros et al. | |
| 2012/0280528 A1 * | 11/2012 | Dellock et al. | 296/1.08 |

* cited by examiner

*Primary Examiner* — Anh V La
(74) *Attorney, Agent, or Firm* — Reising Ethington P.C.

(57) ABSTRACT

A lighting system for the exterior of a vehicle that includes a housing, a sensor, a lamp assembly, and a controller. The sensor is carried by the housing and detects the presence of a hazard in a predetermined region on the ground adjacent to the vehicle. The lamp assembly is carried by the housing and has a light source for projecting light onto at least a portion of the region. The controller is coupled to the sensor and the lamp assembly. The controller has a light activation input and, upon receipt of a light activation command at the input, it controls the lamp assembly to project light from the lamp assembly of a first color or other visible characteristic when no hazard is detected by the sensor and of a second color or other visible characteristic when the hazard is detected by the sensor.

16 Claims, 3 Drawing Sheets

VEHICLE PUDDLE LAMP RESPONSIVE TO GROUND SURFACE CONDITIONS

TECHNICAL FIELD

This invention generally relates to exterior vehicle lighting and, in particular, to vehicle puddle lamps.

BACKGROUND

Automotive vehicles have various lighting systems. These systems may include lighting and signaling devices mounted to the front, sides, rear, topside, and/or underside of the vehicle. Lighting systems may provide illumination to enable the driver to operate the vehicle in dimly lit environments and may increase the conspicuity of the vehicle.

One such lighting device is a puddle lamp or convenience light which may be mounted to a side mirror on a motor vehicle. The puddle lamp may provide lighting on the ground in the vicinity of the vehicle door to which the side mirror is attached.

SUMMARY

In accordance with one embodiment of the invention, there is provided a lighting system for the exterior of a vehicle that includes a housing, a sensor, a lamp assembly, and a controller. The sensor may be carried by the housing and may be for detecting the presence of a hazard in a predetermined region on the ground adjacent to the vehicle. The lamp assembly may be carried by the housing and may have a light source for projecting light onto at least a portion of the region. And the controller may be coupled to the sensor and the lamp assembly. The controller may include a light activation input and, upon receipt of a light activation command at the input, may control the lamp assembly to project light from the lamp assembly having a first characteristic when a normal condition is detected by the sensor and having a second characteristic when a hazard condition is detected by the sensor. The first and second characteristics of the projected light are visibly distinct so as to provide a visible indication of the normal or hazard condition present in the predetermined region. Non-limiting examples of such characteristics are color, intensity, variability (e.g., continuous versus flashing).

According to another embodiment, there is provided a lighting system for the exterior of a vehicle that includes a housing, a sensor, a lamp assembly, and an electronics control unit (ECU). The sensor may be carried by the housing and may be for detecting the presence of a hazard in a predetermined region on the ground adjacent to the vehicle. The lamp assembly may be carried by the housing and may have a light source for projecting light onto at least a portion of the region. And the ECU may be coupled to the sensor and the lamp assembly. The ECU may include one or more light activation inputs and, upon determination of an exterior lighting condition, may control the lamp assembly to project light from the lamp assembly of a first color when no hazard condition is detected by the sensor and of a second color when a hazard condition is detected by the sensor.

According to another embodiment, there is provided a method of lighting a region adjacent a vehicle. A sensing step may sense for the presence of a hazard condition on the ground adjacent a door of a vehicle using a sensor carried by the vehicle. The sensor may be positioned to detect the hazard condition within a predetermined region near the vehicle. And a lighting step may light at least a portion of the region in response to a command received by a controller associated with the sensor. At least a portion of the region may be lit using a first color in the absence of the detection of the hazard condition. And at least a portion of the region may be lit using a second color following the detection of the hazard condition.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The lighting system described herein may be used in a variety of vehicles and is especially adapted to vehicles having side mirror assemblies. The term vehicle, as used herein, should be construed broadly and may include motor vehicles, all-terrain or off-road vehicles, motorcycles, etc. While the lighting system is described with respect to a vehicle, other embodiments and applications are also possible.

Figure 1A:
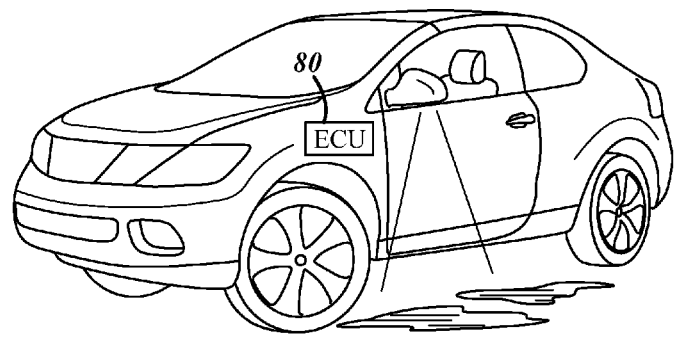
FIG. 1A is a perspective view of a vehicle having an exemplary vehicle lighting system parked near a water puddle adjacent its passenger side door.
Figure 1B:
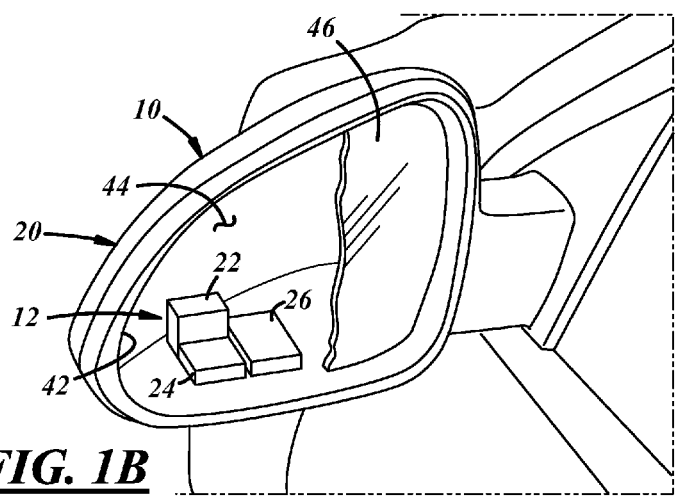
FIG. 1B is a perspective view of an exemplary side mirror assembly.

With reference to FIGS. 1A and 1B, there is shown one example of a lighting system for the exterior of a vehicle. The lighting system has a housing which carries a sensor and a lamp assembly. The sensor may detect the presence of a hazard, such as a puddle of water, in a predetermined region on the ground adjacent to the vehicle, and the lamp assembly may have a light source for emitting or projecting light onto a least part or portion of the predetermined region on the ground. Based on the detected ground surface conditions, the lighting system can selectively project light having a visible characteristic that signals a user of the surface condition. As an example, where water or ice is detected on the ground in the predetermined region, the lamp assembly may project light having a visible characteristic such as a specific color, intensity, and/or flashing pattern indicative of the hazard condition. For this purpose, the lighting system may have a controller which is electrically coupled to the sensor and the lamp assembly (which may be independently electrically coupled to one another as well). The controller may actuate the light source in the lamp assembly upon detection of the hazard or hazard condition on the ground. In one embodiment, the lamp assembly is actuated automatically as a result of a vehicle user remotely starting the vehicle engine or remotely unlocking a vehicle door(s); the light emitted from the lamp assembly of a vehicle side mirror varies in color and/or intensity depending upon the presence or absence of a detected fluid within the predetermined region on the ground near the side mirror. Here, the term 'vehicle user' or 'user' should be construed broadly to include any person using, accessing, ingressing, egressing, etc. the vehicle (unless otherwise stated).

In FIG. 1B, a side mirror assembly 10 for a vehicle includes a housing 20. The housing 20 may be an enclosure having an opening 42 to a cavity 44 therewithin. The cavity 42 may include supporting structure and various features for fixedly supporting or carrying components such as a mirror 46, a sensor 22, a lamp assembly 24, and in some embodiments, a controller 26. In addition, the exterior of the housing 20 may also have an appliqué and structural features for mounting the side mirror assembly to the vehicle and may have an electrical interface for coupling power or signals between the vehicle and the housing. Various implementations for all such structures and features for mechanically and electrically coupling the lighting system components to the housing 20, and for coupling the housing 20 to the vehicle, are known or will be apparent to those skilled in the art. In addition, the illustrated shapes of the housing 20, the cavity 44, and the opening 42 are merely exemplary; other shapes are also possible. Furthermore, while the housing is illustrated as a side mirror assembly, this is not necessary; the housing may be any module carrying the sensor 22 and the lamp assembly 24 and may be located elsewhere on the vehicle (e.g., at or near a passenger door, at or near the trunk or rear hatch, etc.).

The mirror 46 may substantially span the opening 42 and be adequately spaced from the edges of the opening to allow positional adjustment. In some instances, the mirror 46 may be coupled to any suitable mechanical and electrical components (not shown) to facilitate adjustment (e.g., up/down, right/left tilt of the mirror).

The sensor 22 may be a discrete component or a module that may be located within the cavity 44 of the housing 20—e.g., at or on the bottom of the housing. In one embodiment, the sensor may be a passive device such as a daylight, night-vision, infrared, or other suitable camera or photonic imaging device. The sensor may have one or more inputs and outputs and may be coupled to a processor, memory, and/or other suitable electronics or circuitry such that the processor or other control circuitry is responsive to instructions such as software or firmware—e.g., image processing software or firmware. For example, image processing software may be used to distinguish normal ground surface conditions (e.g., dry pavement) from a hazard condition. Thus, the sensor 22 may be tuned to detect various potential vehicle user hazard conditions on the ground adjacent to the vehicle such as snow, ice, mud, and various liquids including water and vehicle fluids (e.g., oil, transmission fluid, radiator fluid, etc.). When the sensor 22 detects a hazard condition, a HAZARD state may be indicated at a hazard output on the sensor (e.g., to the controller 26 and/or other devices, as will be discussed in greater detail below). A HAZARD state may be one in which a predetermined region on the ground adjacent the vehicle near the sensor and lamp assembly has a hazardous or potentially dangerous condition or where debris, clutter, water and/or other fluids are detected within the region. In the absence of a hazard condition, a normal condition may exist. Thus, a NORMAL state may include instances which are not a HAZARD state. Where the sensor is a camera, the housing 20 may have a first aperture 48 (FIG. 1C) for accepting light from outside the cavity 44. According to the orientation of FIG. 1A, where the lowermost part of the housing 20 is also nearest the ground, the aperture may be located on the bottom or the base of the housing. Examples of cameras include but are not limited to CCDs (or charge-coupled devices) and CMOSs (complementary metal-oxide-semiconductor devices); examples of imaging devices or imagers include SWIRs (short wave infrared cameras), LWIRs (long range infrared cameras), and I² devices (image intensifiers). In other embodiments, sensor 22 may be a more rudimentary sensor with the controller 26 being used to determine the NORMAL or HAZARD state based on the data it receives from the sensor 22.

In one embodiment, an ambient light detector (ALD) may be included either as a part of sensor 22 or as a separate component. The ALD used in the illustrated embodiment is included as a part of the sensor 22 and thus is not separately shown. As will be appreciated by those skilled in the art, this may be done by implementing sensor 22 as a module having both the ALD and the other (photonic, acoustic or other) sensing element that is used for obtaining the data needed to distinguish between the NORMAL and HAZARD states. The ALD is capable of determining an exterior lighting condition (i.e., a condition where vehicle lighting may be useful), such as occurs outdoors between sunset and sunrise, and indoors in situations of no or low ambient light. The ALD may evaluate, quantify, and/or otherwise determine the presence of daylight or other ambient light on or near the exterior of the vehicle. For example, the ALD may trigger (or actuate) when the exterior light exceeds a predetermined threshold (e.g., a luminous or light intensity threshold). If the threshold is met, the sensor may determine an exterior lighting condition exists and may indicate or provide a LIGHTING state at a sensor output (e.g., to the controller 26 and/or other devices, as will be discussed in greater detail below). If the threshold is not met, a NONLIGHTING state may be indicated.

Table I illustrates a matrix of potential lighting and hazard conditions. Depending upon whether an exterior lighting condition exists and whether a hazard condition exists, the lamp assembly may be ON or OFF, and the color and/or intensity of the lamp assembly may vary (as shown).

TABLE I

|   | NONLIGHTING state | LIGHTING state |
| --- | --- | --- |
| NORMAL state | Lighting threshold not met (Lamp Assembly OFF); No hazard detected (Lamp Assembly OFF). | Lighting threshold met (Lamp Assembly ON); No hazard detected (Lamp Assembly ON - standard color and/or standard brightness) |
| HAZARD state | Lighting threshold not met (Lamp Assembly OFF); Hazard detected (Lamp Assembly OFF). | Lighting threshold met (Lamp Assembly ON); Hazard detected (Lamp Assembly ON - nonstandard color or standard color but higher intensity) |

The table shows that during either NONLIGHTING state, the lamp assembly is not actuated. However, when a LIGHTING state exists, the lamp assembly may be illuminated using a standard color at a standard intensity during a NORMAL state. And when the LIGHTING state exists during a HAZARD state, the lamp assembly may be illuminated with either a nonstandard color (at any intensity) or the standard color at a different intensity (e.g., a higher intensity). As used herein, the standard color may be any color (e.g., white), and the nonstandard color may be any color other than the standard color (e.g., red, yellow, orange, etc.). The standard intensity may be any predetermined intensity; and the nonstandard intensity may be any intensity other than the standard intensity.

Thus, it will be appreciated that a visible characteristic of the projected light may be used to indicate to a user the general condition of the surface of the ground at the driver, passenger and/or other doors of the vehicle. This is done by changing the characteristic between two or more distinctly different visible characteristics of the light projected from the lamp assembly. These characteristics may include color and/or intensity as noted above, and/or may include other characteristics such as variability of the light where, for example, a constant illumination of the ground under the lamp assembly indicates a NORMAL condition whereas a flashing (or flashing followed by constant illumination) indicates a HAZARD condition. Thus, while the illustrated embodiment is described using color and/or intensity as the signalling characteristic, it will be appreciated that any other suitable characteristic of the projected light could be used in addition to, or in lieu of, color and/or intensity.

Other embodiments of the sensor 22 may include one or more active devices to enable the sensor to sense a hazard condition. An active device may project visible or non-visible light (e.g., electromagnetic radiation) onto the region of interest or illuminate the region (i.e., the ground adjacent the vehicle, such as near the vehicle door). As will be appreciated by skilled artisans, such illuminating devices may enable an imaging device or camera to then capture an image in conditions in which the device or camera may not otherwise do so. The illuminated region may be lighted using continuous or pulsed light. An example of an active device is LIDAR (or LIght Detection And Ranging). Another example of using an active device may be to illuminate the region of interest with near-infrared light and then capture an image with a low-light CCD camera.

Figure 1C:
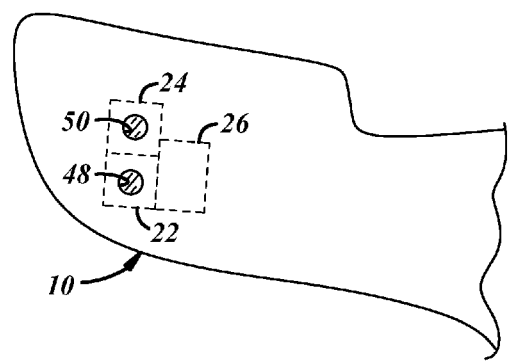
FIG. 1C is a bottom view of the exemplary side mirror assembly.
Figure 2:
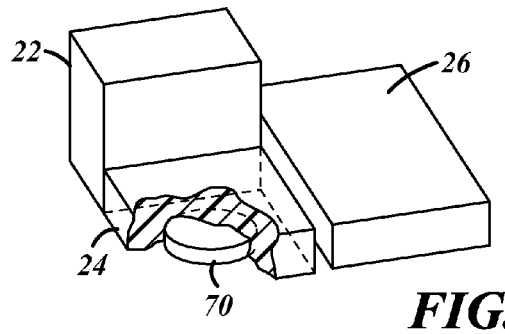
FIG. 2 is a perspective view of a sensor, a lamp assembly, and a controller.

With reference to FIGS. 1B, 1C, and 2, the lamp assembly 24 may have a light source 70 and supporting circuitry (not shown). The lamp assembly may have one or more inputs and may also be coupled to the housing 20; it may be fixedly mounted within the interior of the cavity 44 and also aligned with the aperture 48 or a second aperture 50 (as shown in FIG. 1C) so that when the lamp assembly 24 is actuated the light emitting or projecting therefrom is directed at least partially downward toward the ground from the bottom of the housing 20. The area or region of the ground which is lit or illuminated may depend on the orientation of the lamp assembly or the light source 70 therein or other devices or apparatuses of the light assembly 24 between the light source and the ground (e.g., lenses, mirrors, reflectors or reflective surfaces, baffles, etc.). Other orientations of the lamp assembly 24 are also possible; for example, the aperture(s) may be located on the side of the housing 20 away from the vehicle so that light is directed at least in part both parallel to the ground and outwardly away from the vehicle during the lamp assembly actuation.

The light source 70 may emit or project light at various colors or intensities (e.g., light intensity or luminous intensity). As used herein changes in color or light color refers to the emitted or projected light at various wavelengths in the electromagnetic spectrum. Any given color may be a discrete wavelength or may be light emitted at two or more wavelengths—including wavelengths in the spectrum not visible to the human eye. As used herein changes in light intensity refers to changes in the power or luminous flux per a given area (e.g. watts/meter$^2$). And as used herein luminous intensity refers to the measured wavelength-weighted power emitted by a light source in a particular direction per unit solid angle (intensity with respect to the sensitivity of the human eye).

Figure 3A:
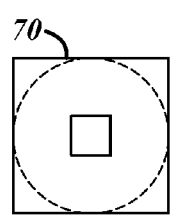
FIG. 3A is an exemplary light source.
Figure 3B:
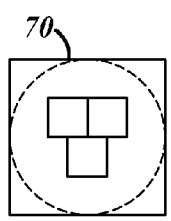
FIG. 3B is another exemplary light source.

In one embodiment of the lamp assembly 24, the light source 70 (FIG. 2) may be one or more light emitting diodes (LEDs). For example, the LED may be a single chip LED (FIG. 3A); i.e., a single LED fixedly mounted on a silicon substrate. The light color, light intensity, and/or luminous intensity may be adjustable (e.g., by varying the electric current or voltage at the diode). In another example, the LED may be several single-chip LEDs or a multi-chip LED (FIG. 3B) (i.e., a plurality of LEDs fixedly mounted to a common substrate). Here, at least some of the single-chip LEDs may be adjustable in color and intensity, and the remaining single chip LEDs may have a generally fixed color or fixed intensity when actuated. Similarly, on a multi-chip LED, at least one of the LEDs may be adjustable in color and intensity while the remaining LEDs may emit a generally fixed color at a generally fixed intensity. Another example of a multi-chip LED may include a chip having three LEDs—one LED having a first color, second LED having a second color, and a third LED having the first color but at a greater intensity (either light intensity or luminous intensity).

Other light source embodiments are possible too; e.g., the light source 70 may include other various lighting technology, such as incandescent, fluorescent, halogen, high-intensity discharge (HID), or any other suitable technology.

Figure 3C:
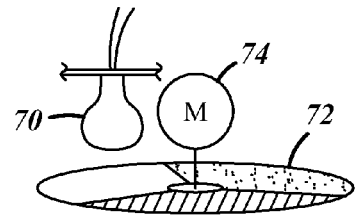
FIG. 3C is an exemplary lamp assembly.

In another embodiment (FIG. 3C), the lamp assembly 24 may include the light source 70 and a color changer or color-changing member 72. In this instance, the light source 70 may be an LED, incandescent, or other suitable technology. The light from the light source 70 may still be directed downwardly through the aperture (e.g., 48 and/or 50) towards the ground; however, before the light exits the housing 20, it may pass through the color changer 72. The color changer may include various filters through which the transmitted light must pass before passing through the aperture. One example of a color changer is a color wheel coupled to an electric motor 74. The color wheel may include two or more panes—the panes filtering the light being emitted from the light source. Thus, to change the color with the color changer 72, the electric motor must be energized or actuated to enable rotation of the color wheel to switch to a different pane or filter. As an example, the color wheel may have two panes—one pane may not filter light at all while the other pane may filter out all visible light except red light. Or in another example the color wheel may have three panes—the first pane may not filter the light at all, the second pane may not filter the color of the light at all but may filter the intensity (effectively dimming the light as its passes therethrough), and the third pane may filter out all visible all light except yellow light. The illustration of FIG. 3C is merely intended to be one example of a color changer and is not intended to limit the embodiment to color changers only having this arrangement or design. For example, a stationary color changing component may be used that is electrically actuatable to selectively filter different colors to thereby create the different color characteristics.

Turning now to the controller 26, the controller may be configured to execute control logic and may control power and signal inputs and/or outputs thereby. In one embodiment, the controller may provide the logic functionality for actuating different light colors or intensities at the lamp assembly 24—e.g., based on the detection of lighting and hazard conditions. Via the controller's inputs and outputs, it may control the power and/or signals to and from the sensor 22 and the lamp assembly 24. At least one input on the controller may be a light activation input. This light activation input receives a light activation command that may come from a door sensor, remote entry controller, or other vehicle electronics to signal the controller to switch on the light source of the light assembly 24. And where the sensor has an ALD, the controller 26 may receive an indication of a hazard condition from the sensor. Thus, the controller may be configured to execute the various states shown in Table I.

The controller 26 may be implemented by one or more processing units, processors, microprocessors, micro-controllers, discrete logic circuit(s) having logic gates for implementing logic functions on data signals, application specific integrated circuits (ASIC) with suitable logic gates, complex programmable logic devices (CPLD), programmable or field-programmable gate arrays (PGA/FPGA), and/or the like.

Generally, the controller 26 may carry out computer-executable instructions, (e.g., those associated with or embedded in software or computer programs including operating systems, application programs, and/or the like). Computer programs, software, or firmware may include executable instructions for implementing logical functions and may be embodied in any computer-readable medium for use by or in connection with the controller 26 that can retrieve and execute the instructions. As used herein, computer-readable medium refers to a non-transitory (e.g., non-volatile) storage device. The software may include, but is not limited to routines, modules, objects, components, data structures, and/or the like, for performing particular tasks and/or implementing particular abstract data types. Computer programs may exist in a variety of forms both active and inactive. General examples include software programs comprised of instructions in source code, object code, executable code and/or other formats; firmware programs; hardware description language (HDL) files; and/or the like. Specific examples include assembler, C, C++ objects, Visual Basic, Visual C++, XML, Java, Microsoft® Foundation Classes, PERL, PHP, SQL, and/or the like. The system and methods described herein may use various types of computer-readable media, which may contain, store, and/or carry instructions or programs for implementing some or all of the method steps described herein in conjunction with the controller 26.

Figure 4:
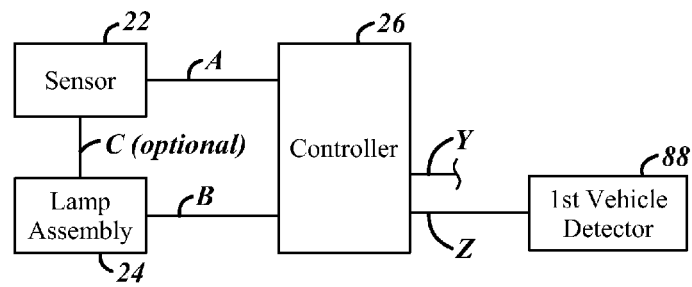
FIG. 4 is an electrical architecture diagram of a vehicle lighting system.

FIG. 4 illustrates an electrical architecture diagram including the controller 26, the sensor 22, the lamp assembly 24, a first vehicle detector 88, and multiple lines (A, B, C, Y, and Z). The first vehicle detector may include any electrical, mechanical, and/or chemical detecting or sensing element or device on the vehicle. In some instances, it may be quantitative and/or may be operative in ON/OFF states (e.g., upon reaching some variable or predetermined threshold value). For example, the vehicle detector may be an ambient light detector (ALD).

The lines may be wires, traces, conduits, buses, or any other suitable means for electrically coupling or connecting (or interconnecting) the sensor, the lamp assembly, the controller, and other suitable vehicle components (e.g., via the device or component inputs and outputs). The illustrated lines may enable uni-directional or bi-directional communication and/or power. For example, lines Y and Z are coupled as inputs to the controller 26 (e.g., Y may be vehicle power and Z may be coupled to the first vehicle detector). And line A may connect an input/output at the controller to a sensor input/output; line B may connect an input/output at the controller to an input at the lamp assembly. And optional line C may connect an output at the sensor to an input at the lamp assembly.

Thus, in one implementation of FIG. 4, the sensor may be capable of detecting a hazard condition and an exterior lighting condition—where the sensor has an ALD. When the sensor 22 determines a LIGHTING state, it may communicate a light activation command to the controller via a sensor output and the controller's light activation input (via line A). The sensor may also indicate a hazard condition to the controller (i.e., a NORMAL state or a HAZARD state). If the sensor 22 indicates a NORMAL state, the controller 26 may actuate the lamp assembly 24 at a standard color and standard intensity. However, if the sensor 22 indicates a HAZARD state, the controller 26 may actuate the lamp assembly 24 at a nonstandard color (or e.g., alternatively, at the standard color with a different or higher intensity).

In another implementation of FIG. 4 where the sensor 22 has an ALD, the controller may power the sensor 22 via line A during periods when it may be desirable to have the sensor 'sensing' or ON. When the power is not provided, neither the sensor or lamp assembly may be ON. However, when the sensor is ON and when the sensor detects a LIGHTING state, it may communicate with the lamp assembly via line C instructing the lamp assembly to be ON. Depending upon whether the sensor determines a NORMAL or HAZARD state, the sensor may communicate to the lamp assembly (also via line C) to use standard or nonstandard color (and/or intensity).

In another embodiment using the controller 26, the sensor 22 may not determine the exterior lighting condition—this may be determined by the first vehicle detector 88. For example, line Y may provide continuous power to the controller 26 and vehicle detector 88 may be coupled to a controller input (e.g., a light activation input) via line Z. The vehicle detector 88 may provide a light activation command or HI signal (indicating a LIGHTING state) or a LO signal (indicating a NONLIGHTING state). During a NONLIGHTING state, either the sensor 22, the lamp assembly 24, or both may be OFF. During a LIGHTING state, the sensor may be ON and may indicate whether a hazard condition exists (e.g., to the controller)—and the color and/or intensity of the light emitted from the lamp assembly may be determined thereby.

In yet another related embodiment, line Z may be intermittent power and line Y may not be connected. This embodiment may operate generally similar to the previous embodiment, however, the power may be provided to the controller 26 via line Z only when an exterior lighting condition exists. Thus, the light activation command at the light activation input may also be power.

Figure 5:
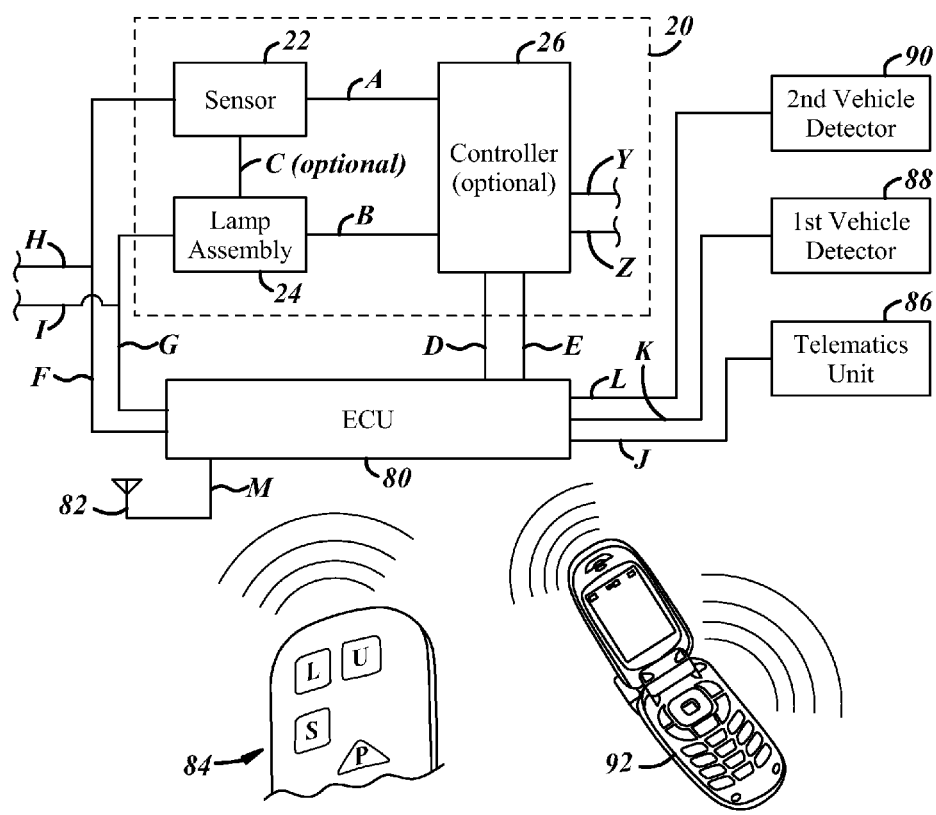
FIG. 5 is an electrical architecture diagram of another vehicle lighting system.

FIG. 5 illustrates another electrical architecture diagram which includes the same arrangement of the sensor, the lamp assembly, and the controller shown in FIG. 4, except the controller 26 herein is optional. Therefore, the controller, the sensor, and the lamp assembly and their functionality will not be re-described. In FIG. 5, the sensor, the lamp assembly, and the controller are shown within the housing 20. FIG. 5 also shows an electronic control unit (ECU) 80, an antenna 82, a keyfob 84, a telematics unit 86, and two other vehicle components: a first vehicle detector 88 and a second vehicle detector 90.

The ECU may be configured to execute control logic, carry out computer-executable instructions, and/or control power and signal inputs and/or outputs thereby. In at least one embodiment, the ECU may include all the components and functionality of the controller 26. The ECU may further contain hardware capable of processing wireless communications (e.g., pairing, sending, receiving, etc. via a short range wireless communication such as Bluetooth or WiFi-Direct). In some implementations, the ECU may have more inputs and outputs than the controller.

The second vehicle detector may be similar to the first vehicle detector, previously described. The first and second vehicle detectors described herein are merely exemplary—there may be third, fourth, fifth, etc. vehicle detectors.

The term telematics unit includes any electronic device fixedly located within or detachably coupled to the vehicle which provides wireless telecommunication of voice and data. Line J, which couples the ECU to the telematics unit, may enable bi-directional communication therebetween.

The keyfob may include any electronic device capable of wirelessly commanding an associated vehicle to perform a vehicle operation or action. The keyfob may capable of authenticating communications therebetween—e.g., to provide secure access to various network devices (such as the vehicle or the vehicle ECU). The keyfob may have various buttons or switches—e.g., in FIG. 5, the keyfob is illustrated with LOCK (L), UNLOCK (U), START (S), and PANIC (P) pushbutton switches dedicated to specific vehicle actions.

As used herein, the term handheld communications device (HCD) includes any suitable electronic devices which may be used to make mobile voice and/or data calls across a wide geographic area where transmissions are facilitated by a cellular and/or otherwise wireless communication system. Non-limiting examples of the HCD include a cellular telephone, a personal digital assistant (PDA), a Smart Phone, a personal laptop computer having two-way communication capabilities, a netbook computer, or combinations thereof.

As shown in FIG. 5, the ECU 80 may be coupled to all other components or devices via its inputs and outputs (lines D, E, F, G, J, K, L and M). Lines D and E may couple the ECU to the controller (e.g., one of the controller inputs may be a light activation input); lines F and G may couple the ECU to the sensor and the lamp assembly, respectively. Lines J, K, and L may couple the ECU to the telematics unit, the first vehicle detector, and the second vehicle detector, respectively. Line M may couple the ECU to the antenna. And the keyfob 84 and/or HCD may be wirelessly coupled to the ECU via the antenna. The HCD may be wirelessly coupled to the telematics unit as well. In addition, lines H and I may intersect with lines F and G thereby also being coupled to the sensor and the lamp assembly, respectively. Lines H and I may allow other vehicle components (not shown) to power, control, and/or communicate with the sensor and light assembly, respectively.

It will be apparent to skilled artisans that the implementations described below may not require the use of both the controller 26 and the ECU 80. Therefore, the ECU 80 may be used instead of the controller 26 just as the controller 26 may be configured to embody the functionality of the ECU 80. In one embodiment of the illustration shown in FIG. 5, the ECU may communicate with the sensor 22 via line F and the lamp assembly 24 via line G. Via line F, the ECU may command the sensor 22 to sense (or actuate), and via line F, the sensor may indicate whether a hazard condition exists (i.e., a NORMAL state or a HAZARD state). Via line G, the ECU may command the lamp assembly when and in what manner to actuate (e.g., during an exterior lighting condition, the color and/or intensity may be dependent upon the hazard condition).

In one implementation, the ECU 80 may be coupled to one or more vehicle detectors for determining the existence of an exterior lighting condition. For example, the first vehicle detector 88 may include an ALD. The ALD may indicate to the ECU a LIGHTING state via a light activation input when the exterior light is below a predetermined light intensity threshold. This input may or may not be passed to the controller 26 (e.g., via the controller's light activation input)—e.g., whether the ECU indicates a LIGHTING state to the controller may depend on which device (the controller or the ECU) is controlling the lamp assembly. In either case, the lamp assembly 24 may be actuated—and the light intensity and/or color will be dependent upon the output of the sensor 22 (e.g., dependent upon whether the output is a NORMAL or HAZARD state, as previously described).

A vehicle door detector may be the second vehicle detector 90. The door detector may provide an indication of whether a door is at least partially open or closed. The term door as used herein may be construed broadly to include a driver or passenger door, a trunk compartment, a rear hatch, a hood, etc. Where this detector determines that the door is open or ajar, the ECU may or may not indicate to the controller 26 a LIGHTING state (e.g., at a light activation input via line D or E)—e.g., whether the ECU indicates to the controller may depend on which device (the controller or the ECU) is controlling the lamp assembly. And in at least one embodiment, the first vehicle detector 88 is an ALD and the second vehicle detector 90 is a door detector; and the ECU 80 determines an exterior lighting condition based on the first and second detectors (e.g., when both provide a LIGHTING state). The ECU then may provide a light activation command to the controller 26 to actuate the light assembly 24. And in another embodiment, the ECU may determine when and in what manner to command the lamp assembly—e.g., based on input received from the sensor 22 (i.e., a NORMAL or HAZARD state) and the determination of an exterior lighting condition. Thereafter, the ECU may control the lamp assembly (i.e., regulating the color and/or intensity of the light).

In another implementation, a vehicle motion detector may be the second vehicle detector 90. The term vehicle motion detector as used herein may be construed broadly to include any detector or sensing device on the vehicle capable of determining vehicle motion (including speed, acceleration, and/or impulses). Examples of detectors include devices at a vehicle wheel and/or tire (e.g., to determine whether the vehicle is moving forwardly or rearwardly) and an accelerometer. If the vehicle is stationary and still, the ECU may indicate an exterior lighting condition to the controller 26. The exterior lighting condition may be determined by the ECU based at least in part on the detection of momentary accelerations or impulses while the vehicle wheels are stationary (e.g., a user or other person bumping or shaking the vehicle during ingress or egress; e.g., imparting an impulse). In one embodiment, the first vehicle detector 88 is an ALD, and the second vehicle detector 90 is a vehicle motion detector. When both the first and second detectors indicate a LIGHTING state to the ECU, the ECU may then determine the existence of an exterior lighting condition and command the controller 26 to actuate the light assembly 24. And in another embodiment, the ECU may determine when and in what manner to command the lamp assembly—e.g., based on input received from the sensor 22 (i.e., a NORMAL or HAZARD state) and the determination of an exterior lighting condition. Thereafter, the ECU may control the lamp assembly (i.e., regulating the color and/or intensity of the light).

The ECU 80 also may be coupled to or otherwise in communication with wireless electronics devices such as a keyfob 84 or a handheld communications device (HCD) 92. The communications therefrom may be useful or helpful in determining an exterior lighting condition—i.e., when the keyfob is used, it may be assumed that the driver is within a predetermined proximity and that vehicle exterior lighting may be useful or helpful. The vehicle may be equipped with an antenna 82 (onboard the vehicle) which may receive wireless transmissions from the associated vehicle keyfob 84; and the antenna 82 may be coupled to the ECU via line M. Therefore, the ECU may be able to process remote commands from the keyfob 84 such as to remotely start the vehicle engine, to remotely lock/unlock the vehicle doors, to remotely actuate the vehicle horn and various exterior lights of the vehicle in a PANIC mode, and remotely operate other suitable commands. The transmission of remote commands of a vehicle keyfob and the reception thereof and the processing thereof by an ECU is known to those skilled in the art. Thus, when the ECU receives a command via a wireless transmission from the keyfob 84, the ECU 80 may issue a light activation command to the controller, as previously described. Upon transmission of a keyfob command, the lamp assembly may be actuated regardless of the intensity of ambient exterior lighting (similarly, the sensor 22 may 'sense' in such situations). However, in at least one embodiment, the first vehicle detector 88 is an ALD and is used in addition to a keyfob—the ECU 80 may determine an exterior lighting condition and issue a light activation command to the controller 26 when both the vehicle detector 88 indicates a LIGHTING state to the ECU and the ECU receives a keyfob command (another LIGHTING state). Thereafter, the controller may actuate the lamp assembly. And of course it is possible that the ECU may determine when and in what manner to command the lamp assembly (i.e., without the controller)—e.g., based on input received from the sensor 22 (i.e., a NORMAL or HAZARD state) and the determination of an exterior lighting condition. Thereafter, the ECU may control the lamp assembly (i.e., regulating the color and/or intensity of the light).

In a related embodiment, the ECU 80 may issue a light activation command to the controller if it receives a wireless HCD vehicle command from the HCD 92. The term HCD vehicle command as used herein may be construed broadly to include to include commands to remotely start the vehicle engine or to remotely lock/unlock the vehicle doors, etc. As previously described with respect to the keyfob 84, upon transmission of a HCD vehicle command, the ECU may determine an exterior lighting condition regardless of the intensity of the ambient exterior lighting (similarly, the sensor 22 may 'sense' in such situations). However, in at least one embodiment, the first vehicle detector 88 is an ALD and is used in addition to a HCD. When both the vehicle detector 88 provides a LIGHTING state to the ECU and the ECU receives an HCD command, the ECU 80 may issue a light activation command to the controller 26. And of course, an embodiment exists as previously described without the controller—the ECU communicating with the sensor and lamp assembly directly.

The ECU may also determine (at least in part) an exterior lighting condition based upon the HCD vehicle command being received at the ECU via the telematics unit 86. The HCD 92 may communicate directly to the telematics unit 86 or the HCD vehicle command may be received by a remote service center or call center which in turn communicates the command to the vehicle via the telematics unit. It should also be appreciated that it is also possible that the service center may remotely issue a vehicle command via the telematics unit without the use of the HCD and that such instances may also trigger the ECU 80 to determine an exterior lighting condition state to the controller.

Figure 6:
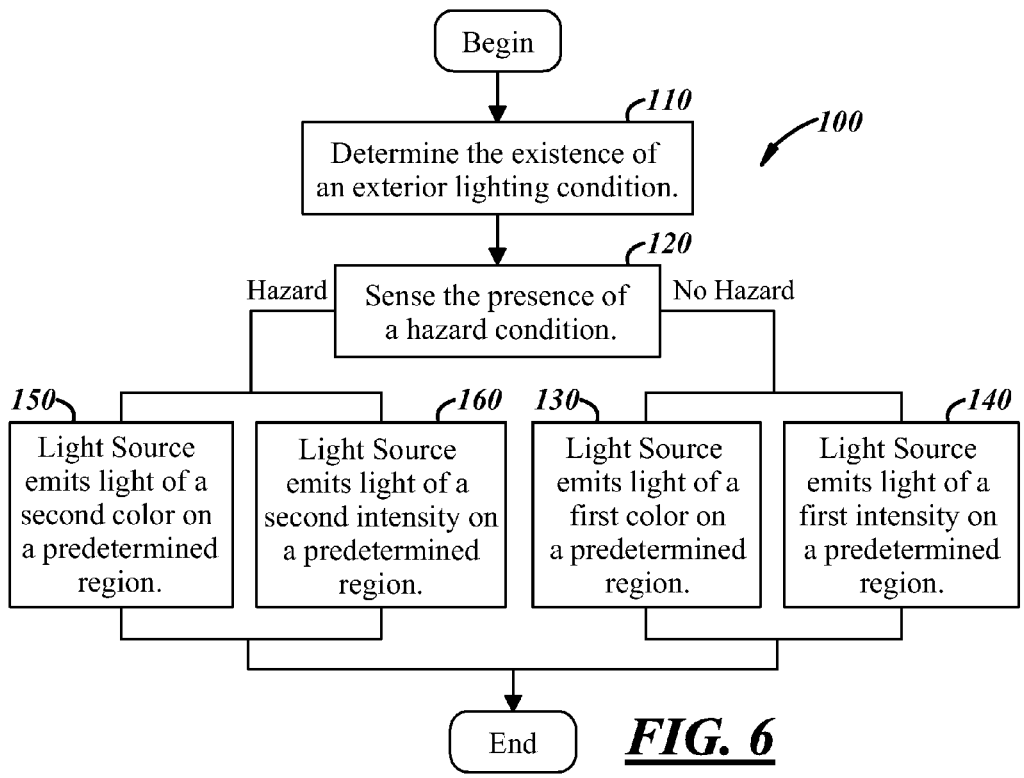
FIG. 6 is a flowchart illustrating one exemplary embodiment of a method of using the vehicle lighting system.

Turning now to the operation of the lighting system 12, one method 100 is illustrated by way of example in FIG. 6. The method begins at step 110 where the ECU 80 determines the existence of a vehicle exterior lighting condition. The lighting condition may include any instance where lighting a region on the ground adjacent to the vehicle may be helpful or necessary to the vehicle user. For example, the lighting condition may include instances where the user is proximate to the vehicle (e.g., the user bumps or imparts an acceleration or impulse to the body of the car; the user manually unlocks the vehicle door, the user actuates a function of the vehicle keyfob such as door unlock, engine start, etc.). The lighting condition may even include instances where it is not a vehicle user proximate to the vehicle but instead is a vehicle intruder (e.g., a person attempting to trespass or enter the vehicle without the user's permission).

In instances where the ECU 80 has determined the existence of a vehicle exterior lighting condition, step 120 includes attempting to sense the presence of a hazard condition using sensor 22 in a predetermined region on the ground adjacent the vehicle (e.g., near a vehicle door). The predetermined region may vary in size and shape and maybe dependent upon the detection capabilities of the sensor 22 (e.g., the effectual field of view (FOV) of the sensor 22 may be circular or elliptical or lobe-like; thus, the predetermined region may be circular or elliptical or lobe-like). Where the sensor 22 fails to detect the hazard condition (or detects a normal condition), the method may proceed to step 130 or step 140 or both. In step 130, the light source 70 emits or projects light of a first color onto at least a portion of the predetermined region. In step 140, the light source emits or projects light at a first intensity onto at least a portion of the predetermined region. Where the sensor 22 detects the hazard condition, the method may proceed to step 150 or step 160 or both. In step 150 the light source 70 emits or projects light of a second color onto at least a portion of the predetermined region. In step 160, the light source emits or projects light at a second intensity onto at least a portion of the predetermined region. The first color may be different from the second color, and the first intensity may be different from the second intensity. In one embodiment, the first color may be generally white- or opaque-colored light; and the second color may be a color indicative of a hazard condition or warning such as a yellow- or red-colored light. In another embodiment, the first intensity and the second intensity may be of the same color (e.g., white-colored light); however, the second intensity may be greater than the first so that the brightness may be indicative of a hazard or warning. Thus it is possible that when the sensor 22 detects a normal condition, the light emitted from the light source 70 is a dimly lit white-colored light, and when the sensor 22 detects the presence of a hazard condition, the light emitted from the light source 70 is a brightly lit yellow-colored light. Other combinations are also possible.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A lighting system for the exterior of a vehicle, comprising:
 a housing;
 a hazard sensor carried by the housing for detecting the presence of a plurality of hazards in a predetermined region on a ground surface adjacent to the vehicle;
 a lamp assembly carried by the housing having a light source for projecting light onto at least a portion of the region; and
 a controller coupled to the hazard sensor and the lamp assembly,
 wherein the controller is configured to:
  receive an indication of a vehicle user ingress or a vehicle user egress;
  receive an input from the hazard sensor;
  determine a condition on the ground surface in the predetermined region adjacent the vehicle; and
  actuate the lamp assembly based on receiving the indication of user ingress or egress and based on the determining step,
  wherein the determining step includes:
   when none of the plurality of hazards exist in the predetermined region, then illuminating the predetermined region according to a first brightness or a first color or both; and
   when one of the plurality of hazards exists in the predetermined region, then illuminating the predetermined region according to a second brightness or a second color or both.

2. The lighting system of claim 1, wherein the light source comprises one or more LEDs arranged to selectively project the first and second colors of light, wherein at least two of the LEDs that project light have colors different than each other.

3. The lighting system of claim 1, wherein the lamp assembly further comprises a color-changing member for changing the color of the emitted light from the light source.

4. The lighting system of claim 1, wherein the plurality of hazards include: a vehicle fluid, snow, ice, and mud.

5. The lighting system of claim 1, wherein the controller is coupled to an electronics control unit (ECU) in the vehicle, wherein the ECU is configured to provide the controller with the indication of the vehicle user ingress or egress.

6. The lighting system of claim 5, wherein the indication of the vehicle user ingress or egress includes an association with one of a vehicle door sensor, a remote engine-start command, or a remote door-unlock command.

7. The lighting system of claim 6, wherein the remote engine-start command or the remote door-unlock command is wirelessly received from a remote service center wirelessly connected to the vehicle, a handheld communications device, or a vehicle keyfob.

8. The lighting system of claim 1, wherein the housing further carries a mirror and is located near a driver-side or passenger-side door of the vehicle providing the driver a rearview to the left or right sides of the vehicle.

9. A lighting system for the exterior of a vehicle, comprising:
 a housing;
 a hazard sensor carried by the housing for detecting the presence of a plurality of hazards a hazard in a predetermined region on a ground surface adjacent to the vehicle; and
 a lamp assembly carried by the housing having a light source for projecting light onto at least a portion of the region; and
 an electronics control unit (ECU) coupled to the hazard sensor and the lamp assembly,
 wherein the ECU is configured to:
  receive an indication of a vehicle user ingress or a vehicle user egress;
  receive an input from the hazard sensor;
  determine a condition on the ground surface in the predetermined region adjacent the vehicle; and
  actuate the lamp assembly based on receiving the indication of user ingress or egress and based on the determining step,
  wherein the determining step includes:
   when none of the plurality of hazards exist in the predetermined region, then illuminating the predetermined region according to a first brightness or a first color or both; and
   when one of the plurality of hazards exists in the predetermined region, then illuminating the predetermined region according to a second brightness or a second color or both.

10. A method of lighting a region adjacent a vehicle, comprising the steps of:
 receiving an indication of a vehicle user ingress or a vehicle user egress;
 sensing for the presence of a hazard condition on a ground surface adjacent the vehicle using a hazard sensor carried by the vehicle;
 determining whether the hazard condition exists on the ground surface adjacent the vehicle; and
 illuminating the ground surface according to a first visible indication or a second visible indication,
 wherein the determining and illuminating steps include:
  when no hazard condition is determined to exist on the ground surface, then illuminating the predetermined region according to the first visible indication; and
  when at least one hazard condition is determined to exist on the ground surface, then illuminating the predetermined region according to the second visible indication.

11. The method of claim 10, wherein the first and second visible indications include a difference in illumination intensity.

12. The method of claim 10, wherein the first and second visible indications include a difference in illumination color.

13. The method of claim 10, wherein the indication of the vehicle user ingress or the vehicle user egress includes receiving: a remote engine-start command, a remote door-unlock command, or a door unlock command.

14. The method of claim 13, wherein the indication originates from at least one of the following: a remote service center wirelessly connected to the vehicle, a handheld communications device, or a vehicle keyfob.

15. The method of claim 10, wherein the hazard condition includes at least one of the following: a vehicle fluid, snow, ice, and mud.

16. The method of claim 10, wherein one of the first or second visible indications is a flashing indication.

* * * * *